US00H002142H

(19) United States
(12) Statutory Invention Registration
Elizondo et al.
(10) Reg. No.: US H2142 H
(43) Published: Jan. 3, 2006

(54) METHOD FOR MEASURING THE CONCENTRATION OF BODYMAKER LUBRICANT IN BODYMAKER COOLANT

(76) Inventors: Edward Elizondo, 601Highpoint Cir., Rochester Hills, MI (US) 48307; George J. Beyer, 1352 Madison, Troy, MI (US) 48083; Andrew M. Hatch, 2557 Orbit Dr., Lake Orion, MI (US) 48360

(21) Appl. No.: 09/238,790

(22) Filed: Jan. 28, 1999

Related U.S. Application Data

(60) Provisional application No. 60/073,010, filed on Jan. 29, 1998.

(51) Int. Cl.
*G01N 31/00* (2006.01)

(52) U.S. Cl. ..... 436/60

(58) Field of Classification Search ..... 423/276, 423/297; 44/314; 436/60
See application file for complete search history.

(56) References Cited

U.S. PATENT DOCUMENTS

| | | | | | |
|---|---|---|---|---|---|
| 3,750,847 | A | * | 8/1973 | Sluhan | 184/1 E |
| 3,912,643 | A | * | 10/1975 | Adams | 252/49.6 |
| 4,204,259 | A | * | 5/1980 | Yabe | 438/497 |
| 5,266,493 | A | * | 11/1993 | Young | 436/55 |
| 5,584,945 | A | * | 12/1996 | Nittel et al. | 148/246 |

FOREIGN PATENT DOCUMENTS

| | | | |
|---|---|---|---|
| JP | 06199602 A | * | 7/1994 |
| RU | 2071477 C1 | * | 1/1997 |

OTHER PUBLICATIONS

Negina et al. "Potentiometric determination of boron in an oxidizing medium", Zavod, LAb. 1968, 34(3), 278–279 (Russ) (AN 69:64316q CA).*

Karazhanov et al. "Conditions for the existence of boron–citrate complexes in solution", Izv. Akad. NAuk Kaz. SSR, Ser. Khim. 1968, 18(3), 1–6 (AN 69:70596x CA).*

Reti "Deep water analyses and geochemistry.6", Banyasz. Kohasz. Lapok, Koolaj Foldgaz 1971, 4(1), 23–6 (AN 75:132837m CA).*

Fodor "Determination of boron oxide in silicates by potentiometry", Epitoanyag 1980, 32(5), 198–200 (93:125089n CA).*

* cited by examiner

*Primary Examiner*—Aileen B. Felton

(57) ABSTRACT

A bodymaker coolant in an aluminum drawing-and-ironing operation often is a slurry in water of a predominantly organic "neat lube" that includes a boron-amine complex as one of its constituents. The neat lube is consumed during use and therefore needs to be replenished in the bodymaker coolant, but chemical analysis of the neat lube in bodymaker coolant has proved to be difficult in practice. It has been found that (1) the concentration of boron in the bodymaker coolant serves as an adequate proxy for the concentration of all other constituents in the neat lube that need to be controlled during use of the bodymaker coolant in order to obtain sufficiently precise control to assure commercially reliable results from passage of container units through the drawing and ironing process, even if the bodymaker coolant includes suspended fine particles of metal; and (2) other constituents of many conventional bodymaker coolants interfere significantly with standard methods for the analytical determination of boron content, but this interference can be prevented by suitable additions to a sample of the bodymaker coolant. An improved analytical method is based on these discoveries.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MEASURING THE CONCENTRATION OF BODYMAKER LUBRICANT IN BODYMAKER COOLANT

CROSS-REFERENCE TO RELATED APPLICATIONS

Priority is claimed from application Ser. No. 60/073,010 filed Jan. 29, 1998.

STATEMENT REGARDING FEDERALLY SPONSORED RESEARCH OR DEVELOPMENT

Not Applicable.

BACKGROUND OF THE INVENTION

This invention relates to measuring, and thereby making possible effectively controlling, the concentration of materials other than water used in a predominantly aqueous liquid composition for cooling and lubricating metal objects, particularly advantageously objects of tin plated steel and of aluminum and its alloys, while these objects are being severely cold worked. The invention is still more particularly advantageously applicable to conventional manufacturing of elongated cylindrical beverage containers, of the shape commonly used for millions of such containers per day in the United States alone, for beer, other carbonated beverages, and the like, from sheets of a suitable metal by two successive well established process steps. In the first of these steps, called "cupping", a flat circular disk of the metal is formed into a relatively shallow "cup". In the second of these steps, generally known in the art as "drawing and ironing" or "draw-ironing", this cup is elongated into the final container shape (exclusive of the top, which is separately formed and attached to the rest of the container). This invention is particularly adapted to, and will be described below primarily in terms of, use in the drawing and ironing stage of making elongated cylindrical beverage containers with aluminum alloy walls. However, the invention is also applicable to any other metal forming operation using a similar lubricant composition.

In a drawing and ironing process, the wall of the original "cup" workpiece is substantially thinned as it is elongated. This process generates so much heat that the aluminum alloy units being processed must be kept in contact during substantially the entire process time with a liquid coolant. The mechanical apparatus used in a drawing and ironing process is usually called a "bodymaker". As a result the liquid coolant used is usually called in the art and will be designated hereinafter as a "bodymaker coolant". This coolant consists predominantly of water, which provides most of the cooling effect, but in all modem high speed container making plants the bodymaker coolant also includes a distinct portion, exclusive of its water content, in order to provide better lubricating properties than would be exhibited by water alone as a bodymaker coolant. This distinct portion is widely known in the art and is designated hereinafter as the "bodymaker coolant lubricant" or "bodymaker lubricant", which terms are considered equivalent in this specification.

Most if not all of the constituents of the bodymaker lubricant, although necessary and useful in the drawing and ironing process, are deleterious to the adhesion of paints, printing inks and lacquers commonly used in subsequent finishing of the containers. These materials are therefore usually removed, or at least diminished in concentration per unit area of container surface, by various cleaning processes applied to the containers between the drawing and ironing process and final finishing with these final finishing materials. Therefore, in order to maintain adequate control and economy of the overall container manufacturing and finishing operation, including the drawing and ironing process itself, it is important to control the concentration of bodymaker lubricant in the bodymaker coolant with at least moderate precision.

A bodymaker lubricant normally includes several constituents, one of which is often a substance formed by chemical association between at least one boric acid molecule and at least one amine molecule. (This substance is variously called in the art a "salt" or a "complex"; either term is considered equivalent herein, and this type of substance is often abbreviated hereinafter as "BAC", from "Boric acid-Amine Complex".) Other common constituents of bodymaker lubricants include amine salts of fatty acids, alkoxylates of fatty acids, "extreme pressure additives" as generally known in art, and other corrosion inhibitors. A practically important constituent of bodymaker coolant (and therefore also of bodymaker lubricant by virtue of the definition of the latter as all of the non-aqueous parts of the former), which is not usually added deliberately but nevertheless is usually present after any substantial time of use, is suspended fine particles of the metal from which the containers are being fabricated. These and any other chemical substances that may be present in the bodymaker lubricant as used, but are not present in freshly prepared bodymaker coolant that includes bodymaker lubricant as specified for the drawing and ironing process, are distinguished from the non-aqueous chemical substances present in freshly prepared bodymaker coolant by calling the latter collectively "bodymaker-lubricant-as-prepared" below.

Some ingredients of the bodymaker-lubricant-as-prepared may be adsorbed to a greater degree than others on the surfaces of the containers during the drawing and ironing process, and/or may be concentrated to a greater degree than others in a thin layer of bodymaker coolant which is carried along on the container surfaces to the next stage of overall container manufacturing (a process characteristic often called "dragout"). Furthermore, in most practical operations, one or more vessels open to the atmosphere contain a substantial fraction of the total volume of bodymaker coolant in use, so that evaporation of the more volatile constituents of the bodymaker coolant almost inevitably occur, and foreign matter can drop into the vessels. In one plant, it was even found that floor cleaning chemicals became admixed with the bodymaker coolant as a result of common pipework that was not known about until investigated after a control problem with the bodymaker coolant arose! For all of these and other reasons, it can not be safely assumed that all materials in the bodymaker lubricant, whether added during makeup or during replenishment of the bodymaker lubricant in the bodymaker coolant, will maintain the relative proportions in which they were added in the bodymaker coolant as a whole during any long time interval after they were added. As a result, in order to guide the replenishment necessary to maintain the concentrations of all the constituents of the bodymaker lubricant within their desired control conecntration limits at all times during the drawing and ironing process, it is necessary to make frequent measurements of at least one, and sometimes more, characteristics of the bodymaker coolant that are correlated in a known manner with the concentration(s) of all of the constituents of the bodymaker-lubricant-as-prepared that are present in a used working bodymaker coolant and that need to be controlled in order to achieve a satisfactory degree of consistency in the results of the draw-ironing step of the total manufacturing process.

Consistently attaining the desired degree of precision of control of concentrations, in the bodymaker coolant as used, of the constituents of bodymaker-lubricant-as-prepared has proved difficult in the art so far. Quantitative analysis of some of the constituents of a typical bodymaker-lubricant-as-prepared is inherently difficult, is complicated by the presence of other constituents of the bodymaker-lubricant-as-prepared, or both.

Prior art methods have usually included a step of separating a sample believed to be representative of the bodymaker coolant as a whole into two liquid phases in a manner thought to be reproducible, followed by measurement of some characteristic of only one of the phases. In one widely used method, the refractive index of a water-rich phase is measured after various means are used to induce phase separation. This method, which inherently measures only a bulk property of the phase on which the measurement is made, has been demonstrated to be satisfactorily correlated with the concentration(s) of the critical ingredients of the bodymaker-lubricant-as-prepared in the bodymaker coolant as a whole, but only if all of the inputs to the bodymaker coolant can be very well controlled. In fact, however, impurities from earlier process steps carried in on the container units themselves and/or impurities introduced from any other source into the bodymaker coolant as a whole can, and in commercial practice often do, cause the measurements of refractive index not to correlate satisfactorily with the concentration(s) of the critical constituent(s) of the bodymaker-lubricants-as-prepared.

Accordingly, one object of this invention is to provide a more reliable method of measuring or otherwise controlling, under practical operating conditions in high speed container manufacturing plants, the concentration(s) of each of at least those constituent(s) of practical bodymaker-lubricants-as-prepared that need the most critical control in order to achieve reliable results. Other concurrent or alternative objects are to provide a method that is relatively low in cost, is simple enough to be performed readily by operators with relatively little training, and/or will provide results quickly. Still other concurrent and/or alternative objects will be apparent from the description below.

Except in the claims and the operating examples, or where otherwise expressly indicated, all numerical quantities used in the description of the invention to indicate amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight; the term "polymer" includes "oligomer", "copolymer", "terpolymer", and the like; the description of a group or class of materials as suitable or preferred for a giving purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not necessarily preclude unspecified chemical interactions among the constituents of a misture once mixed; specification of materials in ionic form implies the presence of sufficient counterions to produce electrical neutrality for the composition as a whole; any counterions thus implicity specified preferably are selected from among other constituents explicitly specified in ionic form, to the extent possible; otherwise such counterions may be freely selected, except for avoiding conterions that act adversely to the objects of the invention; the work "mole" means "gram mole" and the word itself and all of its grammatical variations may by used for any chemical species defined by all of the types and numbers of atoms present in it, irrespective of whether the species is ionic, neutral, unstable, hypothetical, or in fact a stable neutral substance with well defined molecules; and the terms "solution", "soluble", "homogeneous phase", and the like are to be understood as including not only true equilibrium solutions or homogeneity but also dispersions that show no visually detectable tendency toward phase separation over a period of observation of at least 100, or preferable at least 1000, hours during which the material is mechanically undisturbed.

BRIEF SUMMARY OF THE INVENTION

It has been discovered that when a bodymaker coolant that includes a BAC as one of the constituents in its content of a bodymaker-lubricant-as-prepared is used: (1) the concentration of boron in the bodymaker coolant serves as an adequate proxy for the concentration of all other constituents of the bodymaker-lubricant-as-prepared that need to be controlled during use of the bodymaker coolant in order to obtain sufficiently precise control to assure commercially reliable results from passage of container units through the drawing and ironing process, even if the bodymaker coolant includes suspended fine particles of metal; and (2) other constituents of many conventional bodymaker coolants interfere significantly with standard methods for the analytical determination of boron content, but this interference can be prevented by suitable additions to a sample of the bodymaker coolant. As a result of these discoveries, an improved method of controlling the concentration(s) of the constituent(s) of bodymaker-lubricant-as-prepared in the bodymaker coolant used in commercial drawing and ironing process step for making aluminum beverage containers, or in any metal working operation using sufficiently similar lubricant(s) and operating conditions, is provided. Also, a composition suitable to prevent interference by other constituents with the accurate determination of boron is provided.

BRIEF DESCRIPTION OF THE DRAWINGS

Not applicable.

DETAILED DESCRIPTION OF THE INVENTION

A method according to the invention for measuring the concentration, in a water-based bodymaker coolant having a pH value greater than 3.0, of a bodymaker-lubricant-as-prepared that includes a BAC and has a known concentration of boron, comprises steps of:

(I) providing a representative sample of the bodymaker coolant, said representative sample having a total boron content and a precisely known size and being either inherently liquid or dissolved in a solvent to form a liquid solution that contains all of the boron content of the representative sample;

(II) mixing with the representative sample of the bodymaker coolant provided in step (I) a sufficient amount of an interference-preventing-acidulant to form a first mixture with a pH value below 3.0, said interference-preventing-acidulant comprising, more preferably consisting essentially of, or still more preferably consisting of, molecules of:

(A) at least one carboxylic acid having a water solubility of at least 1.0% and at least two carboxyl moieties (i.e., —COOH moieties) per molecule; and, optionally, one or both of the following components:

(B) at least one organic substance that does not include at least two carboxyl moieties per molucule but does include in each molecule at least two total moieties selected from the group consisting of nitrogen atoms that are not tetravalently bonded to any other atoms, phosphorus atoms that are not tetravalently bonded to any other atoms, sulfur atoms that are not hexavalently bonded to any other atoms, hydroxyl moieties that are not part of carboxyl moieties, and ether moieties; and (C) water;

(III) mixing with the first mixture formed in step (II) a sufficient amount of at least one alkali metal or alkaline earth metal hydroxide to form a second mixture having a pH value that is known within 0.1 pH unit and is in a range from 4.0 to 9.0;

(IV) mixing with the second mixture formed in step (III), so as to form a third mixture having a pH value, a total amount of a neutral boric-acid-freeing-substance, said neutral boric-acid-freeing-substance being selected from the group consisting of organic substances that (i) contain no carboxylate or other acid moieties but do include at least three hydroxyl moieties in each molecule and (ii) are soluble in water to an extent of at least 1.0%, said total amount of neutral boric-acid-freeing-substance having both of the following properties:

(1) the pH value of the third mixture is at least 0.5 pH unit lower than the pH value of said second mixture; and (2) if an additional amount of said neutral boric-acid-freeing-substance that is at least 5% of said total amount of neutral boric-acid-freeing-substance is added to the third mixture so as to make a test mixture, the test mixture has a pH value that does not differ by more than 0.1 pH unit from the pH value of the third mixture;

(V) mixing with said third mixture a precisely known sufficient number of moles of hydroxide ions that are soluble in said third mixture, so as to form a fourth mixture having a pH value that differs by not more than 0.1 pH unit from the pH of said second mixture, said precisely known sufficient number of moles of hydroxide ions having the property that, if a precisely known trial number of moles of hydroxide ions that are soluble in said third mixture, said trial number of moles being smaller than said sufficient number of moles by an amount that is at least 2.0% of the sufficient number of moles, had been mixed with said third mixture instead of the sufficient number of moles, so as to form a trial fourth mixture, the trial fourth mixture would have had a pH value that was lower than the pH value of said second mixture by more than 0.1 pH unit; and (VI) calculating a content in grams of boron in said representative sample of bodymaker coolant by multiplying the sufficient number of moles of hydroxide ions mixed in step (V) by 10.8 to generate the content in grams of boron in said representative sample and calculating the concentration of bodymaker-lubricant-as-prepared in the bodymaker coolant from the calculated content in grams of boron in said representative sample, the precisely known concentration of boron in the bodymaker-lubricant-as-prepared, and the precisely known size of the representative sample, the term "precisely measured" in the description above meaning measured in such a manner that there is a probability of at least 95% that three consecutive measurements made in said manner for the same quantity will have a standard deviation from a mean of the three measurements that is not more than 10% of said mean and the term "precisely known" in the description above meaning known within a precision of 10% of the value of any specified quantitative property of a tangible material to which the term is applied, or of a value calculated from use of a non-tangible mathematical function or formula to which the term is applied.

Methods for accomplishing step (I) as described above are known in the art and may be used as known per se in connection with this invention. The bodymaker coolant often contains both stably dispersed and unstably dispersed discontinuous phases, so that the sample should be taken from a well-agitated volume of the bodymaker coolant.

In step (II) the interference-preventing-acidulant may be added in substantially pure form, which would normally be solid, or from a solution, preferably in water. In order to obtain adequately accurate results, the interference-preventing-acidulant must obviously be free from significant amounts of boron. Necessary constituent (A) of the interference-preventing-acidulant preferably is selected from the group consisting of acids that also contain hydroxyl moieties that are not part of their carboxyl moieites and independently preferably is selected from acids that have not more than, with increasing preference in the order given, 8, 6, 5, 4, or 3 carbon atoms per molecule. Examples of acids that satisfy both conditions and are therefore particularly preferred are malic, tartaric, and citric acids, with the latter most preferred. Although the acids themselves are generally preferred as the source of these acids in solution, a combination of salts of these acids and a stronger mineral acid such as sulfuric or hydrochloric acid in sufficient amount to generate the free acids in solution could also be used. No technical harm is known to result from using substantially more of the interference-preventing-acidulant than is needed as specified in the description above, but large excesses are preferably avoided for economy if for no other reason. The invention is not to be considered as limited by any theory, but the interference-preventing-acidulant is believed to have at least two functions in a process according to the invention: to form complex ions with hardness cations such as calcium and magnesium that are often present in the bodymaker coolant as a result of the use of hard water in preparing it and to convert boric acid from its chemical association with amine(s) in the BAC in the bodymaker-lubricant-as-prepared to a form more rapidly neutralizable by reaction with hydroxide ions added during later steps of the process.

Magnesium containing biocides are frequently used constituents of a bodymaker-lubricant-as-prepared, and when the presence of such biocides in the bodymaker coolant being analyzed is known or suspected, the interference-preventing-acidulant used in step (II) of a process according to the invention preferably contains optional component (B) as well as necessary component (A). Preferred constituents for component (B) are molecules that each contain two distinct moieties selected from the group consisting of hydroxyl, ether, and non-tetravalently bonded nitrogen moieties, these two distinct moieties being bonded so that there are exactly two or three carbon atoms in the shortest continuously bonded chain between the nitrogen and/or oxygen atoms in each of the distinct moieties; this arrangement permits formation of a five- or six-membered ring including a metal atom to which each of these distinct electron-rich moieties can form a coordinate covalent bond. Examples of such materials are ethylene glycol and propylene glycol, ethylene diamine and propylene diamine, and ethanol and propanol amines. A particularly preferred example is 8-hdyroxyquinoline, which is most preferably used in a mass that has a ratio to the mass, measured in the same units, of necessary constituent (A) that is at least, with increasing preference in the order give, 0.01:1.0, 0.03:1.0, 0.05:1.0, 0.07:1.0, 0.080:1.0, 0.090:1.0, or 0.100:1.00 and independently preferably is not more than, with increasing preference in the order given, 0.9:1.0, 0.7:1.0, 0.5:1.0, 0.3:1.0, 0.20:1.0, 0.15:1.0, or 0.11:1.0.

In step (III), primarily for reasons of economy, sodium and/or potassium hydroxide is preferably used, with sodium hydroxide preferred. Any hydroxide used may be added in solid form but is usually more conveniently added from solution in water. Independently, the final pH value preferably is at least, with increasing preference in the order given, 4.5, 5.0, 5.5, 6.0, 6.5, 6.7, 6.9, 7.1, 7.3, or 7.5 and independently preferably is not more than, with increasing preference in the order give, 8.8, 8.6, 8.4, 8.2, 8.0, or 7.8.

The neutral boric-acid-freeing-substance used in step (IV) preferably is selected from the group consisting of mannitol, glycerol, and sucrose, with mannitol most preferred. No technical harm is known to result from using substantially more of the neutral boric-acid-freeing-substance than is needed as specified in the description above, but large excesses are preferably avoided for economy if for no other reason.

Step (V) is usually most conveniently and correspondingly preferably accomplished by a conventional titration of the third mixture with a standard solution of hydroxide ions; a titrating solution that is about 0.10 N in $OH^-$ is generally preferred. The number of moles of hydroxide ions contained in the volume of standard solution required to reach the end point then constitutes the "sufficient number" as described for step (V) above, and the smaller number of moles contained in the volume of titrating solution added at any point before the end point constitues a "trial number" as described for step (V) above. Step (V) can also be performed by titration by weight instead of volume, by adding successive weighed amounts of solid hydroxides to the third mixture, and in many other ways readily apparent to those skilled in the art.

Step (VI) may of course be performed by mental, mechanical, and/or electronic calculation, and the calculation of the amount of boron recited in the first part of step (VI) may be integrated with the other calculations recited in step (VI) above, so that only the concentration of bodymaker-lubricant-as-prepared in the bodymaker coolant is explicitly determined.

In each step of the process in which a knowledge of a pH value is required, the value is preferably measure with an electronic pH meter as known in the art. Visual indicators could also be used, but some ingredients of conventional bodymaker coolants are colored and/or light-scattering, and this can make proper choice and use of an indicator difficult.

It should be noted that ordinary borosilicate laboratory glassware is not suitable for use as a container for any sample or mixture specified in a method according to this invention as described above, because enough boron can be leached from such glassware to overwhelm the amount in the sample to be measured. Special low boron glass, platinum, or, more economically, plastic, particularly high density polyethylene or polypropylene, vessels are preferred.

Another embodiment of the invention is a composition particularly suitable to serve as an interference-preventing-acidulant for use in a method according to the invention. This embodiment is a composition of matter that comprises, preferably consists essentially of, or still more preferably consists of, molecules of:

(A) at least one carboxylic acid having a water solubility of at least 1.0% and at least two carboxyl moieties per molecule; and (B) at least one organic substance that does not incude at least two carboxyl moieties per molecule but does include in each molecule at least two total moeities selected from the group consisting of nitrogen atoms that are not tetravalently bonded to any other atoms, phosphorous atoms that are not tetravalently bonded to any other atoms, sulfur atoms that are not hexavalently bonded to any other atoms, hydroxyl moieties that are not part of carboxyl moieties, and ether moieties; and optionally, (C) water.

Preferred constituents and relative ratios between constituents of types (A) and (B) are the same as described above in connection with use of an interference-preventing-acidulant in step (II) of a process according to the invention.

A method according to this invention is well adapted to determining the concentration of lubricants commercially cupplied by Henkel Surface Technologies Div. of Henkel Corporation, Madison Heights, Mich. USA (formerly Diversified Technology, Inc., San Antonio, Tex.) under the designations DTI™ 5600-WB, DTI™ 5600-TRLEX, DTI™ 5600-WB1, DTI™ 5600-WBR, and DTI™ 23J.

The scope and benefits of the invention may be further appreciated from the following non-limiting examples and comparison examples. In the examples, the following procedure was used: Samples of 100 milliliters (hereinafter usually abbreviated as "ml") of a bodymaker coolant that had an initial pH value of 7 or more and included a bodymaker-lubricant-as-prepared with a known boron content were used. A mixture of 1 part of 8-hydroxyquinoline and 9 parts of citric acid, both reagent grade, was added in small portions to the sample of bodymaker coolant, with stirring to any extent necessary for mixing and dissolution of the additive in the sample after each addition. After the last addition of this mixture of interference-preventing-acidulants, the mixture including the original sample has a pH value between 2.0 and 3.0. A 50% NaOH solution in water was then added in just sufficient quantity to bring the pH to a value from 7.5 to 7.8, the actual pH value to the nearest 0.1 unit being recorded for each sample after the sample was allowed to sit for at least two minutes to assure no further change in pH. Mannitol was then added in successive 1.0 gram portions, with any stirring necesary to assure solution, and the pH value measured after each addition, until the last such addition did not change the pH value by as much as 0.1 pH unit, compared with the next-to-last addition. Finally, the mixture thus formed was titrated with 0.10 N NaOH solution in water, with the pH continuously measured, until the pH value returned to that value recorded last before any addition of mannitol. The bodymaker-lubricant-as-prepared content was then calculated from the volume of standard titrating solution used to reach the required pH and the known amount of boron in the bodymaker-lubricant-as-prepared contained in the sample.

Comparison of the resulting calculated values with those obtained by a boron analysis made by atomic emission spectrometry in an inductively coupled plasma, a very accurate but expensive technique, showed agreement within 20% of the values indicated by the inductively coupled plasma technique. In contrast, when addition of the citric acid and 8-hydroxyquinoline was eliminated from the less costly technique otherwise as described above, the calculated values obtained for boron content in bodymaker coolant samples were too high by at least 100% of the actual value determined by inductively coupled plasma and/or calculation from known composition. (Accurate values for boron were obtained from simple solutions of boric acid in water by the less costly technique, even without additions of citric acid and 8-hydroxyquinoline.)

The invention claimed is:

1. A method for measuring the concentration, in a bodymaker coolant that has a pH value greather than 3.0, of a bodymaker-lubricant-as-prepared that includes a boric acid-amine complex, said method comprising operations of:

(I) providing a representative sample of the bodymaker coolant, said representative sample having a total boron content and a precisely known size and being either inherently liquid or dissolved in a solvent to form a liquid solution that contains all of the boron content of the representative sample;

(II) mixing with the representative sample of the bodymaker coolant provided in step (I) a sufficient amount of an interference-preventing-acidulant to form a first mixture with a pH value below 3.0, said interference-preventing-acidulant comprising molecules of:

(A) at least one carboxylic acid having a water solubility of at least 1.0% and at least two carboxyl moieties (i.e., —COOH moieties) per molecule; and, optionally, one or both of the following components:

(B) at least one organic substance that does not include at least two carboxyl moieties per molecule but does include in each molecule at least two total moieties selected from the group consisting of nitrogen atoms that are not tetravalently bonded to any other atoms, phosphorus atoms that are not tetravalently bonded to any other atoms, sulfur atoms that are not hexavalently bonded to any other atoms, hydroxyl moieties that are not part of carboxyl moieties, and ether moieties; and (C) water;

(III) mixing with the first mixture formed in step (II) a sufficient amount of at least one alkali metal or alkaline earth metal hydroxide to form a second mixture having a pH value that is known within 0.1 pH unit and is in a range from 4.0 to 9.0;

(IV) mixing a total amount of a neutral boric-acid-freeing-substance with the second mixture formed in step (III), so as to form a third mixture having a pH value, said neutral boric-acid-freeing-substance being selected from the group consisting of organic substances that (i) contain no carboxylate or other acid moieties but do include at least three hydroxyl moieties in each molecule and (ii) are soluble in water to an extent of at least 1.0%, said total amount of neutral boric-acid-freeing-substance having both of the following properties:

(1) the pH value of the third mixture is at least 0.5 pH lower than the pH value of said second mixture; and (2) if an additional amount of said neutral boric-acid-freeing-substance that is at least 5% of said total amount of neutral boric-acid-freeing-substance is added to the third mixture so as to make a test mixture, the test mixture has a pH value that does not differ by more than 0.1 pH unit from the pH value of the third mixture;

(V) mixing with said third mixture a precisely known sufficient number of moles of hydroxide ions that are soluble in said third mixture, so as to form a fourth mixture having a pH value that differs by not more than 0.1 pH unit from the pH of said second mixture, said precisely known sufficient number of moles of hydroxide ions having the property that, if a precisely known trial number of moles of hydroxide ions that are soluble in said third mixture, said trial number of moles being smaller than said sufficient number of moles by an amount that is at least 2.0% of the sufficient number of moles, had been mixed with said third mixture instead of the sufficient number of moles, so as to form a trial fourth mixture, the trial fourth mixture would have had a pH value that was lower than the pH value of said second mixture by more than 0.1 pH unit; and (VI) calculating a content in grams of boron in said representative sample of bodymaker coolant by multiplying the sufficient number of moles of hydroxide ions mixed in step (V) by 10.8 to generate the content in grams of boron in said representative sample and calculating the concentration of bodymaker-lubricant-as-prepared in the bodymaker coolant from the calculated content in grams of boron in said representative sample, the precisely known concentration of boron in the bodymaker-lubricant-as-prepared, and the precisely known size of the representative sample, the term "precisely known" in the description above meaning known within a precision of 10% of the value of any specified quantitative property of a tangible material to which the term is applied, or of a value calculated from use of a non-tangible mathematical function or formula to which the term is applied.

2. A method according to claim 1, wherein component (A) of the interference-preventing-acidulant is selected from the group consisting of carboxylic acids that:

also contain hydroxyl moieties that are not part of the carboxyl moieties; and have not more than 8 carbon atoms per molecule.

3. A method according to claim 2, wherein the neutral boric-acid-freeing-substance in operation (IV) is selected from the group consisting of mannitol, glycerol, and sucrose.

4. A method according to claim 3, wherein, in operation (III), the final pH value is at least 6.5.

5. A method according to claim 4, wherein operation (V) is performed by titration of the third mixture with a standard solution of hydroxide ions.

6. A method according to claim 1, wherein the neutral boric-acid-freeing-substance in operation (IV) is selected from the group consisting of mannitol, glycerol, and sucrose.

7. A method according to claim 6, wherein, in operation (III), the final pH value is at least 6.5.

8. A method according to claim 7, wherein operation (V) is performed by titration of the third mixture with a standard solution of hydroxide ions.

9. A method according to claim 1, wherein, in operation (III), the final pH value is at least 6.5.

10. A method according to claim 9, wherein operation (V) is performed by titration of the third mixture with a standard solution of hydroxide ions.

11. A method according to claim 1, wherein operation (V) is performed by titration of the third mixture with a standard solution of hydroxide ions.

12. A method according to claim 1, wherein:

component (A) is citric acid;

in operation (III), the final pH value is from about 7.1 to about 8.2; and the neutral boric-acid-freeing-substance utilized in operation (IV) is mannitol.

13. A method according to claim 12, wherein the bodymaker-lubricant-as-prepared includes a magnesium containing biocide and the interference-preventing-acidulant additionally comprises a component (B) which comprises molecules that each contain two distinct moieties selected from the group consisting of hydroxyl, ether, and non-tetravalently bonded nitrogen moieties, these two distinct moieties being bonded so that there are exactly two or three carbon atoms in the shortest continuously bonded chain between the nitrogen or oxygen atoms in each of the distinct moieties.

14. A method according to claim 13, wherein component (B) is 8-hydroxyquinoline and is present in an amount that has a ratio within the range from about 0.080:1.0 to about 0.15:1.0 to the amount of component (A) present in the same interference-preventing-acidulant.

15. A method according to claim 1, wherein the bodymaker-lubricant-as-prepared includes a magnesium containing biocide and the interference-preventing-acidulant additionally comprises a component (B) which comprises molecules that each contain two distinct moieties selected from the group consisting of hydroxyl, ether, and non-tetravalently bonded nitrogen moieties, these two distinct moieties being bonded so that there are exactly two or three carbon atoms in the shortest continuously bonded chain between the nitrogen or oxygen atoms in each of the distinct moieties.

16. A method according to claim 15, wherein component (B) is 8-hydroxyquinoline and is present in an amount that has a ratio within the range from about 0.03:1.0 to about 0.7:1.0 to the amount of component (A) present in the same interference-preventing-acidulant.

17. A composition of matter useful as an interference-preventing-acidulant in a method according to claim 1, said composition consisting essentially of the following components:

(A) at least one carboxylic acid having a water solubility of at least 1.0% and at least two carboxyl moieties per molecule; and (B) at least one organic substance that does not include at least two carboxyl moieties per molecule but does include in each molecule at least two total moieties selected from the group consisting of nitrogen atoms that are not tetravalently bonded to any other atoms, phosphorus atoms that are not tetravalently bonded to any other atoms, sulfur atoms that are not hexavalently bonded to any other atoms, hydroxyl moieties that are not part of carboxyl moieties, and ether moieties; and, optionally, (C) water, the mass of component (B) in the composition having a ratio to the mass of component (A) in the same composition that is from about 0.03:1.0 to about 0.7:1.0.

18. A composition according to claim 17, wherein:

component (A) is selected from the group consisting of carboxylic acids that:

also contain hydroxyl moieties that are not part of the carboxyl moieties; and have not more than 8 carbon atoms per molecule; and component (B) is selected from the group consisting of molecules that each contain two distinct moieties selected from the group consisting of hydroxyl, ether, and non-tetravalently bonded nitrogen moieties, these two distinct moieties being bonded so that there are exactly two or three carbon atoms in the shortest continuously bonded chain between the nitrogen or oxygen atoms in each of the distinct moieties; and the mass of component (B) in the composition has a ratio to the mass of component (A) in the same composition that is from about 0.05:1.0 to about 0.3:1.0.

19. A composition according to claim 18, wherein:

component (A) is selected from the group consisting of malic acid, tartaric acid, and citric acid;

component (B) is selected from the group consisting of ethylene glycol, propylene glycol, ethylene diamine, propylene diamine, ethanol amine, propanol amine, and 8-hydroxyquinoline; and the mass of component (B) in the composition has a ratio to the mass of component (A) in the same composition that is from about 0.080:1.0 to about 0.20:1.0.

20. A composition according to claim 19, wherein:

component (A) is citric acid;

component (B) is 8-hydroxyquinoline; and the mass of component (B) in the composition has a ratio to the mass of component (A) in the same composition that is from about 0.090:1.0 to about 0.11:1.0.

* * * * *